(12) United States Patent
Ogata

(10) Patent No.: US 10,583,570 B2
(45) Date of Patent: Mar. 10, 2020

(54) DISPLACEMENT MEASUREMENT DEVICE, ROBOT, AND ROBOT ARM

(71) Applicant: CANON KABUSHIKI KAISHA, Tokyo (JP)

(72) Inventor: Masaru Ogata, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 332 days.

(21) Appl. No.: 15/723,398

(22) Filed: Oct. 3, 2017

(65) Prior Publication Data
US 2018/0099421 A1    Apr. 12, 2018

(30) Foreign Application Priority Data

Oct. 7, 2016 (JP) .................................. 2016-198590

(51) Int. Cl.
| | |
|---|---|
| B25J 19/02 | (2006.01) |
| B25J 13/08 | (2006.01) |
| B25J 17/02 | (2006.01) |
| B25J 19/06 | (2006.01) |
| G01L 1/12 | (2006.01) |
| G01L 5/16 | (2020.01) |
| G01L 5/00 | (2006.01) |

(52) U.S. Cl.
CPC .......... B25J 19/027 (2013.01); B25J 13/085 (2013.01); B25J 17/0225 (2013.01); B25J 17/0233 (2013.01); B25J 19/063 (2013.01); G01L 1/12 (2013.01); G01L 1/122 (2013.01); G01L 5/009 (2013.01); G01L 5/16 (2013.01)

(58) Field of Classification Search
CPC .... B25J 19/027; B25J 13/085; B25J 17/0225; B25J 17/0223; G01L 5/009
See application file for complete search history.

(56) References Cited

U.S. PATENT DOCUMENTS 3,618,376 A * 11/1971 Shull ....................... G01L 5/161
                                                    73/862.045
4,178,799 A    12/1979 Schmieder et al.
(Continued)

FOREIGN PATENT DOCUMENTS

| JP | 59-18645 B2 | 4/1984 |
|---|---|---|
| JP | H02-59634 A | 2/1990 |

(Continued)

OTHER PUBLICATIONS

Office Action in Japanese Patent Application No. 2016-198590, dated May 29, 2018.
(Continued)

*Primary Examiner* — David M Fenstermacher
(74) *Attorney, Agent, or Firm* — Venable LLP

(57) ABSTRACT

A displacement measurement device includes a first structure, a second structure, and a coupling portion configured to couple the first structure with the second structure. The first structure includes a first sensor configured to generate an electrical signal corresponding to displacement between a first attachment portion of the first structure and a second attachment portion of the second structure in the at least one first direction. The second structure includes a second sensor configured to generate an electrical signal corresponding to displacement between the first attachment portion and the second attachment portion in the at least one second direction.

17 Claims, 10 Drawing Sheets

(56) References Cited

U.S. PATENT DOCUMENTS

| | | | |
|---|---|---|---|
| 4,573,362 A * | 3/1986 | Amlani | G01L 1/2218 |
| | | | 73/862.044 |
| 4,973,215 A * | 11/1990 | Karlen | B25J 9/04 |
| | | | 414/729 |
| 4,998,441 A | 3/1991 | Stuart | |
| 5,594,944 A | 1/1997 | Ogata et al. | |
| 5,602,910 A | 2/1997 | Tsutsui et al. | |
| 7,220,958 B2 | 5/2007 | Kitamura et al. | |
| 8,453,523 B2 | 6/2013 | Sato | |
| 9,200,969 B2 * | 12/2015 | Ueno | G01L 5/16 |
| 9,274,014 B2 * | 3/2016 | Janik | G01L 5/16 |
| 9,405,288 B2 | 8/2016 | Ogata | |
| 10,001,419 B2 * | 6/2018 | Kolbenschlag | G01L 1/04 |
| 10,067,019 B2 * | 9/2018 | Bradford | B25J 19/0095 |
| 10,201,901 B2 * | 2/2019 | Sato | B25J 9/1694 |
| 2002/0056326 A1 | 5/2002 | Gombert et al. | |
| 2010/0312394 A1 | 12/2010 | Arimitsu | |
| 2014/0000388 A1 | 1/2014 | Sato | |
| 2014/0067124 A1 * | 3/2014 | Williamson | G05B 19/406 |
| | | | 700/258 |
| 2014/0224038 A1 | 8/2014 | Masuda et al. | |
| 2016/0091376 A1 | 3/2016 | Sakano | |
| 2017/0113346 A1 | 4/2017 | Nagata et al. | |

FOREIGN PATENT DOCUMENTS

| | | |
|---|---|---|
| JP | 03-245028 A | 10/1991 |
| JP | H05-187940 A | 7/1993 |
| JP | 2005-331261 A | 12/2005 |
| JP | 2009-075083 A | 4/2009 |
| JP | 2010-210558 A | 9/2010 |
| JP | 2010-281635 A | 12/2010 |
| JP | 2011-056601 A | 3/2011 |
| JP | 2012-093213 A | 5/2012 |
| JP | 2012-093291 A | 5/2012 |
| JP | 2012-237570 A | 12/2012 |
| JP | 2013-064706 A | 4/2013 |
| JP | 5376859 B2 | 12/2013 |
| JP | 2014-029326 A | 2/2014 |
| JP | 2014-106174 A | 6/2014 |
| JP | 2016-070824 A | 5/2016 |
| WO | 2013/018715 A1 | 2/2013 |

OTHER PUBLICATIONS

Office Action in Japanese Patent Application No. 2016-198590, dated Oct. 16, 2018.

* cited by examiner

US 10,583,570 B2

DISPLACEMENT MEASUREMENT DEVICE, ROBOT, AND ROBOT ARM

BACKGROUND OF THE INVENTION

Field of the Invention

The present invention relates to a displacement measurement device configured to obtain an amount of displacement, a robot including the displacement measurement device, and a robot arm including the displacement measurement device.

Description of the Related Art

Conventionally, an industrial robot that operates in a factory has performed handling operations such as welding, coating, and conveyance of components. In recent years, application of the robot has spread to fields in which the robot directly acts on an operation target object in, for example, assembly of products and finishing processes such as deburring and polishing, and in which it is required for the robot to operate flexibly. In such fields, the robot is required to operate in accordance with an external force. Therefore, for controlling the operation of the robot, a function of performing indirect force control, in which a force or moment applied to the operation target object is detected and flexibility is given to the robot, and direct force control, in which an operational force is directly designated, is required. Examples of the indirect control include compliance control and impedance control. These two kinds of control will be hereinafter referred to as force control without distinguishing these two kinds.

A force applied to the robot is detected by a displacement measurement device. For example, the displacement measurement device is disposed at a wrist part between a robot arm and a robot hand. This displacement measurement device detects a force generated at the time of an assembly operation performed by the robot, and thus movement and force of each joint of the robot are adjusted. In this way, force control is performed.

A displacement measurement device of this kind detects, for example, a force applied between a first attachment portion attached to a robot arm and a second attachment portion attached to a robot hand, on the basis of elastic deformation of an elastic portion coupling the first attachment portion with the second attachment portion. A "strain gauge system" that detects a stress on a member on the basis of change in resistance of a strain gauge has been a typical means for detecting the elastic deformation of the elastic portion. In recent years, Japanese Patent No. 5376859 has proposed a "displacement detection system" in which a magnetic flux generation source such as a magnet is disposed at a first attachment portion and a magnetoelectric conversion element such as a Hall element is disposed at a second attachment portion, and which obtains relative displacement between the first attachment portion and the second attachment portion. A force is not applied to the magnetoelectric conversion element in this system, and thus this system has a higher durability than the strain gauge system.

In addition, in recent years, a displacement detection system in which a linear encoder that has a high resolution has been also proposed. This system employs digital signal processing in which displacement is counted as a pulse, and thus a high rigidity, high resolution, and high load characteristic can be achieved at the same time, and a wide dynamic range can be realized.

With regard to a robot for assembly, capability of further detailed operation is desired, and thus further improvement of the precision of displacement measurement by a displacement measurement device is desired. Therefore, Japanese Patent Laid-Open No. 2012-237570 has proposed a configuration in which a support portion formed of a rigid body is disposed between a first attachment portion and a second attachment portion, the first attachment portion is coupled with the support portion by a first elastic portion, and the second attachment portion is coupled with the support portion by a second elastic portion. To be noted, in Japanese Patent Laid-Open No. 2012-237570, the first attachment portion is described as a pedestal member, the second attachment portion is described as an action member, and the support portion is described as a rigid member. The first elastic member is configured to be elastically deformed by a force in a first direction but not elastically deformed by a force in a second direction. In addition, the second elastic member is configured to be elastically deformed by a force in the second direction but not elastically deformed by a force in the first direction. Further, in the configuration, a magnetic flux generation source is disposed at the pedestal member, a magnetoelectric conversion element is disposed at the action member so as to oppose the magnetic flux generation source, and relative positions of or relative displacement between the pedestal member and the action member are detected.

SUMMARY OF THE INVENTION

According to one aspect of the present invention, a displacement measurement device is configured to obtain amounts of displacement between a first member and a second member in at least one first direction and in at least one second direction different from the at least one first direction. The displacement measurement device includes a first structure including a first attachment portion configured to be attached to the first member, a second structure including a second attachment portion configured to be attached to the second member, and a coupling portion configured to couple the first structure with the second structure. The first structure includes a first sensor configured to generate an electrical signal corresponding to displacement between the first attachment portion and the second attachment portion in the at least one first direction. The second structure includes a second sensor configured to generate an electrical signal corresponding to displacement between the first attachment portion and the second attachment portion in the at least one second direction.

Further features of the present invention will become apparent from the following description of exemplary embodiments with reference to the attached drawings.

DESCRIPTION OF THE EMBODIMENTS

Exemplary embodiments of the present invention will be described in detail below with reference to drawings.

First Exemplary Embodiment

Figure 1:
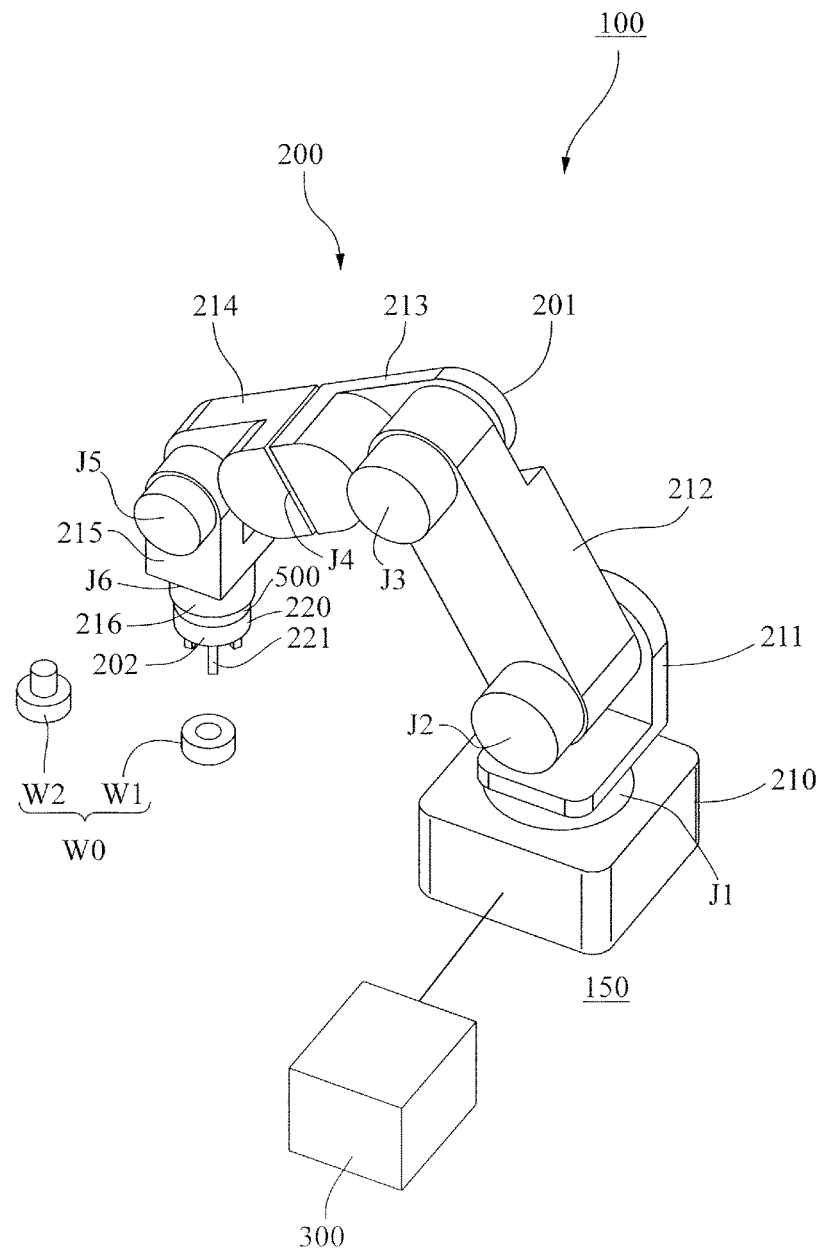
FIG. 1 is a perspective view of a robot apparatus according to a first exemplary embodiment.

FIG. 1 is a perspective view of a robot apparatus according to a first exemplary embodiment. In FIG. 1, a workpiece W1 serving as a first workpiece is, for example, a ring-shaped member, and a workpiece W2 serving as a second workpiece is, for example, a member including a projection portion that fits in a ring-shaped member.

A robot apparatus 100 includes a robot 200 serving as an industrial robot, and a control apparatus 300 that controls the operation of the robot 200. The robot 200 is a vertically articulated robot. That is, the robot 200 includes a vertically articulated robot arm 201 and a robot hand 202 serving as an end effecter that functions as a hand of the robot 200 attached to the distal end of the robot arm 201.

In addition, the robot 200 includes a displacement measurement device 500 disposed between the distal end of the robot arm 201 and the robot hand 202. Therefore, the robot hand 202 is coupled with the distal end of the robot arm 201 via the displacement measurement device 500.

The robot arm 201 includes plural links 210 to 216 rotatably coupled with one another via joints J1 to J6. The link 210 is a link of a proximal end serving as a base portion fixed to a stand 150, and the links 211 to 216 transmit displacement and force. Each of the joints J1 to J6 of the robot arm 201 is provided with a driving device including an electric motor and so forth. As the driving device for each of the joints J1 to J6, a device having an appropriate output is selected in accordance with required torque.

The robot hand 202 includes a hand body 220 and plural fingers 221 openably and closably supported by the hand body 220. The workpiece W1 serving as the first workpiece can be held by closing the plural fingers 221, and the holding of the workpiece W1 can be released by opening the plural fingers 221. A mounting operation of mounting the workpiece W1 on the workpiece W2 serving as the second workpiece can be performed by holding the workpiece W1 by using the plural fingers 221. As a result of the mounting operation performed by the robot 200, a product W0 constituted by the workpieces W1 and W2 is produced.

The displacement measurement device 500 measures the amount of displacement between the link 216 and the hand body 220 of the robot hand 202. The link 216 serves as the distal end of the robot arm 201 serving as a first member, and the robot hand 202 serves as a second member.

Figure 2A:
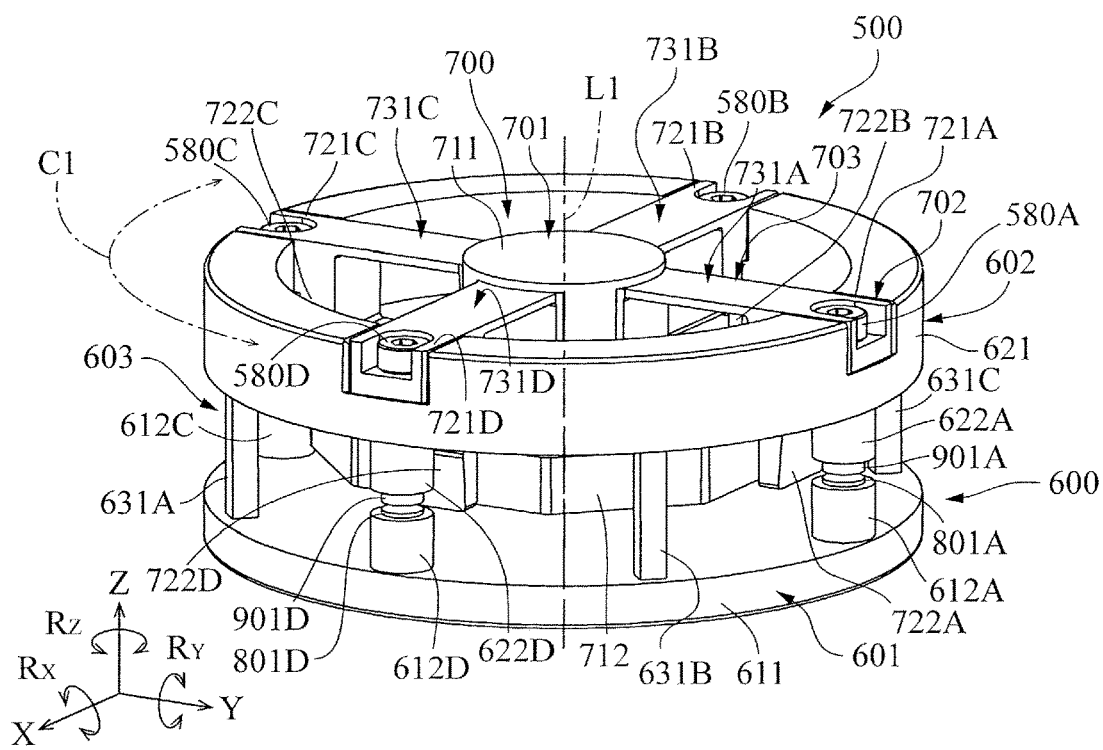
FIG. 2A is a perspective view of a displacement measurement device according to the first exemplary embodiment.
Figure 2B:
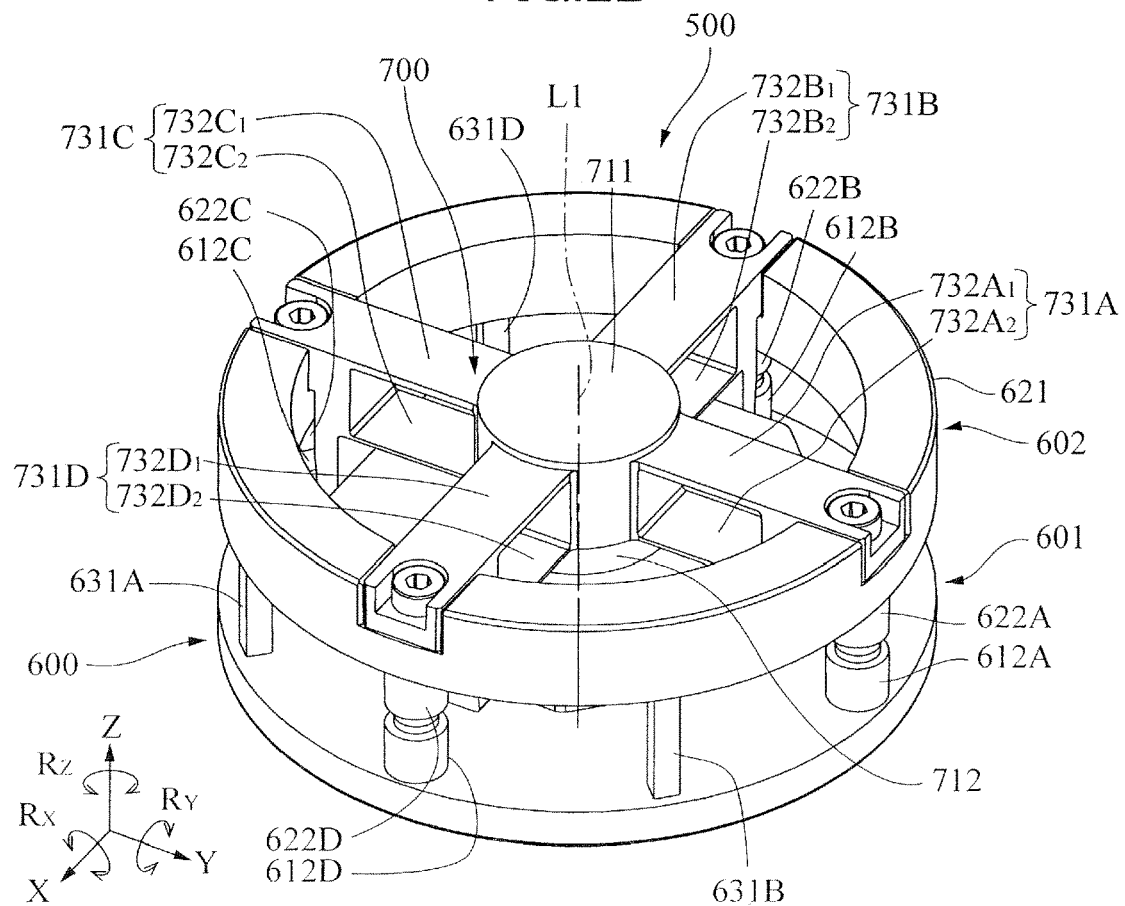
FIG. 2B is a perspective view of the displacement measurement device from an angle different from FIG. 2A.
Figure 3A:
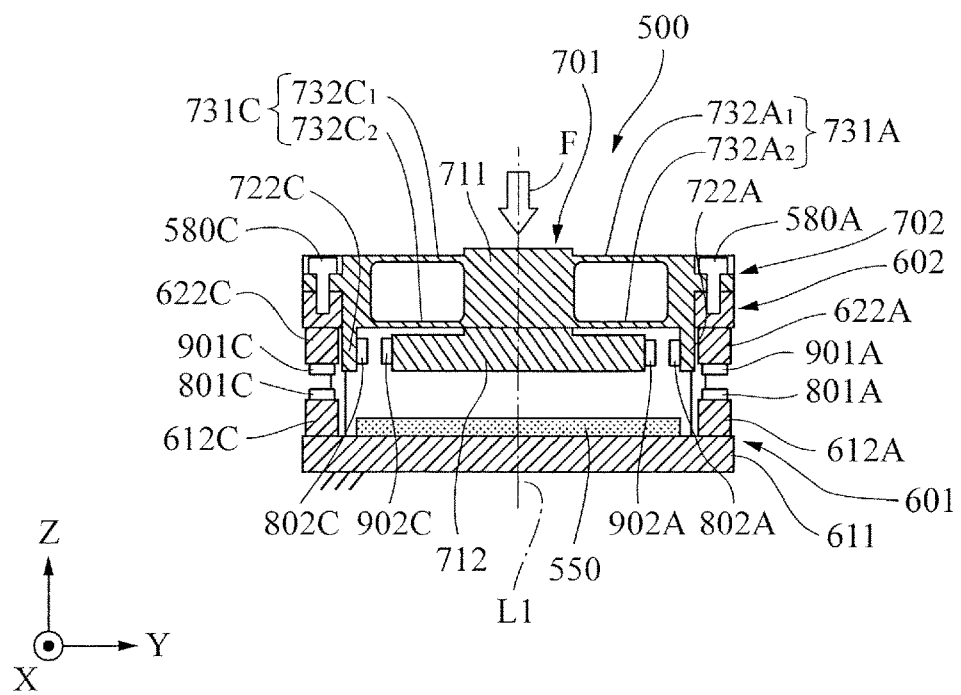
FIG. 3A is a section view of the displacement measurement device taken along a plane passing through a center axis.
Figure 3B:
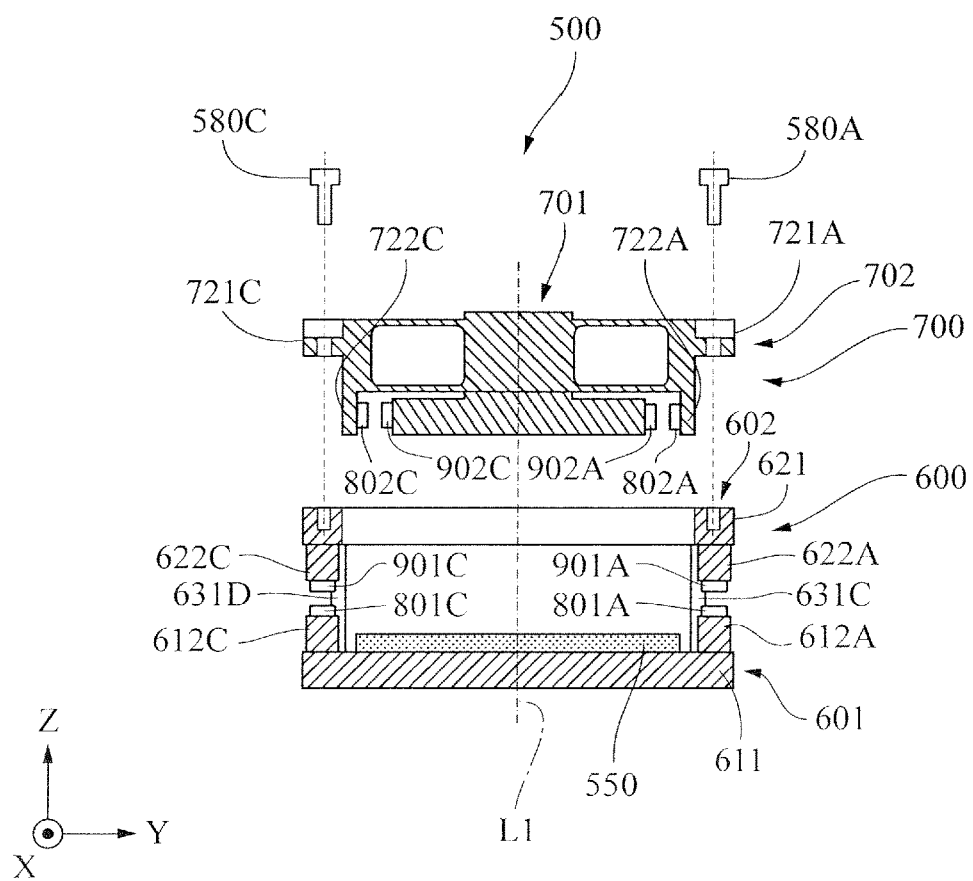
FIG. 3B is a section view of the displacement measurement device disassembled into a first structure and a second structure.
Figure 4:
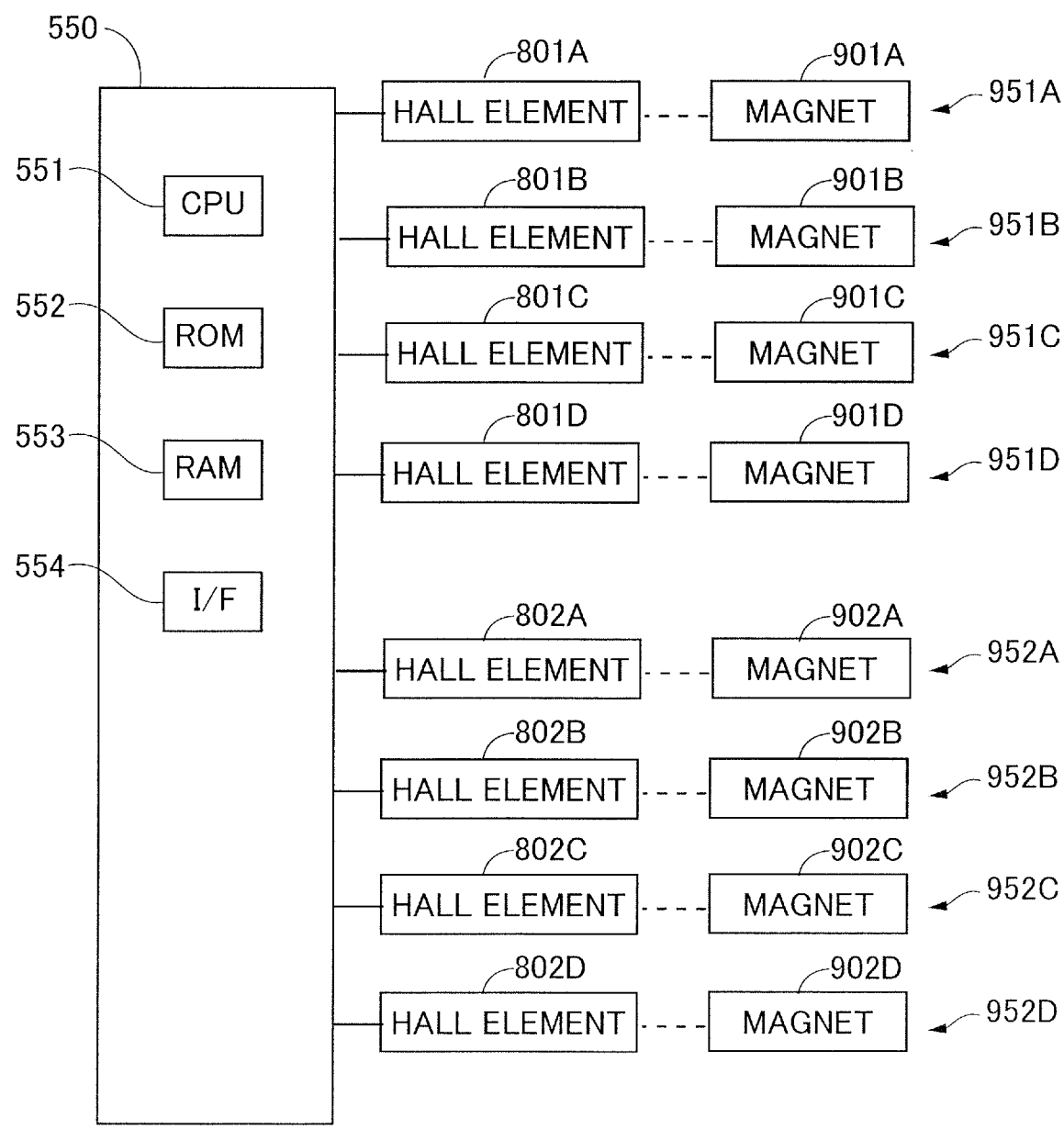
FIG. 4 is a block diagram illustrating a configuration of a detection system of the displacement measurement device according to the first exemplary embodiment.

FIGS. 2A and 2B are perspective views of the displacement measurement device 500 according to the first exemplary embodiment. To be noted, FIG. 2B is a perspective view of the displacement measurement device 500 from an angle different from FIG. 2A. FIG. 3A is a section view of the displacement measurement device 500 taken along a plane passing through a center axis L1 illustrated in FIGS. 2A and 2B. FIG. 3B is a section view of the displacement measurement device 500 disassembled into a first structure and a second structure. FIG. 4 is a block diagram illustrating a configuration of a detection system of the displacement measurement device 500 according to the first exemplary embodiment.

A three-dimensional orthogonal coordinate system based on the displacement measurement device 500 is set as an XYZ orthogonal coordinate system. The displacement measurement device 500 is a six-axis force sensor that detects translational forces Fx, Fy, and Fz in the directions of X, Y, and Z axes, which are translational directions, and moments Mx, My, and Mz, which are rotational forces in rotational directions $R_X$, $R_Y$, and $R_Z$ about the X, Y, and Z axes. Since moment is a kind of force, specifically rotational force, force and moment will be sometimes collectively referred to as force below without distinguishing force and moment.

The displacement measurement device 500 is disposed between the robot arm 201 and the robot hand 202 serving as a pair of measurement targets, and is capable of detecting a force applied between the robot arm 201 serving as a primary side and the robot hand 202 serving as a secondary side. For example, when the robot hand 202 comes into contact with a workpiece during a mounting operation, an external force F derived from the contact that is illustrated in FIG. 3A is applied to the displacement measurement device 500 via the robot hand 202.

The displacement measurement device 500 includes a structure 600 disposed on the robot arm 201 side and a structure 700 disposed on the robot hand 202 side. Main parts of the two structures 600 and 700 are formed of metal. These structures 600 and 700 are coupled with each other via bolts 580A to 580D serving as plural coupling members that are coupling portions. Although a case where the structures 600 and 700 are stuck together by using an adhesive instead of being coupled with each other via the bolts 580A to 580D can be considered, it is preferable that the structures 600 and 700 are coupled via the bolts 580A to 580D in consideration of the durability of the adhesive and a dimensional error that may be caused by the thickness of the adhesive.

As illustrated in FIG. 4, the structure 600 serving as a first structure includes plural sensors that are four sensors 951A to 951D serving as first sensors in the present exemplary embodiment. The sensors 951A to 951D respectively include Hall elements 801A to 801D serving as first detecting members and magnets 901A to 901D serving as first detected members. In addition, the structure 700 serving as a second structure includes plural sensors that are four sensors 952A to 952D serving as second sensors in the present exemplary embodiment. The sensors 952A to 952D respectively include Hall elements 802A to 802D serving as second detecting members and magnets 902A to 902D serving as second detected members. Further, the displacement measurement device 500 includes a control circuit 550 that obtains electrical signals serving as detection signals indicating detection results from the Hall elements 801A to 801D and 802A to 802D, and that obtains forces of the six axes on the basis of these electrical signals.

As illustrated in FIGS. 2A, 2B, 3A, and 3B, the structure 600 includes an attachment member 601 and a support member 602. The attachment member 601 serves as a first attachment portion configured to be attached to the link 216 of the robot arm 201 serving as a first member, and the support member 602 serves as a first support portion. Further, the structure 600 includes an elastic member 603 serving as a first elastic portion coupling the attachment member 601 with the support member 602. The elastic member 603 coupled with the attachment member 601 and the support member 602 by being integrally formed with these members from the same peace of the material as these members. In addition, the attachment member 601 and the support member 602 are formed as rigid bodies that have a higher rigidity than the elastic member 603 and are not easily deformed by an external force.

The structure 700 includes an attachment member 701 and a support member 702. The attachment member 701 serves as a second attachment portion that is configured to be attached to the hand body 220 of the robot hand 202 serving as a second member, and the support member 702 serves as a second support portion. Further, the structure 700 includes an elastic member 703 serving as a second elastic portion coupling the attachment member 701 with the support member 702. The elastic member 703 is coupled with the attachment member 701 and the support member 702 by being integrally formed with these members from the same peace of the material as these members. In addition, the attachment member 701 and the support member 702 are formed as rigid bodies that have a higher rigidity than the elastic member 703 and are not easily deformed by an external force.

The attachment members 601 and 701 are disposed at positions opposing each other with an interval therebetween. A straight line passing through the center of the attachment member 601 and the center of the attachment member 701 will be referred to as the center axis L1. A direction in which the center axis L1 extends is a Z-axis direction, and two directions perpendicular to each other and to the Z-axis direction are X-axis and Y-axis directions. In addition, an intermediate member disposed between the attachment members 601 and 701 is constituted by the support members 602 and 702.

The attachment member 601 and the support member 602 are arranged in the Z-axis direction with an interval therebetween. The attachment member 601 includes a pedestal member 611 and plural projection members that are four projection members 612A to 612D in the present exemplary embodiment. The pedestal member 611 has a disk-like shape having a pair of surfaces, and the projection members 612A to 612D project in the Z-axis direction from one surface of the pedestal member 611 opposite to the other surface on which the attachment member 601 is configured to be attached to the link 216. The projection members 612A to 612D are arranged in a circumferential direction C1 about the center axis L1 at constant intervals, specifically at intervals of 90°.

The support member 602 includes an action member 621 and plural projection members that are four projection members 622A to 622D in the present exemplary embodiment. The action member 621 is a rigid body having a ring-like shape, and the projection members 622A to 622D project in the Z-axis direction from, among a pair of surfaces of the action member 621 in the Z-axis direction, one surface facing the pedestal member 611. The projection members 622A to 622D are arranged in the circumferential direction C1 about the center axis L1 at constant intervals, specifically at intervals of 90°, so as to oppose the projection members 612A to 612D.

The elastic member 603 is a member having elasticity and coupling the attachment member 601 with the support member 602, and is capable of being displaced in first directions, that is, translational directions of the X-axis and Y-axis directions and the rotational direction $R_Z$ about the Z axis. Specifically, the elastic member 603 includes plural columnar elastic bodies extending in the Z-axis direction perpendicular to a surface of the pedestal member 611. The plural columnar elastic bodies are specifically three or more columnar elastic bodies, and are four columnar elastic bodies 631A to 631D in the present exemplary embodiment. These plural columnar elastic bodies 631A to 631D are arranged in the circumferential direction C1 about the center axis L1 with intervals therebetween, one end of each of the plural columnar elastic bodies 631A to 631D is coupled with the pedestal member 611, and the other end of each of the plural columnar elastic bodies 631A to 631D is coupled with the action member 621. Specifically, the plural columnar elastic bodies 631A to 631D are arranged in the circumferential direction C1 about the center axis L1 with constant intervals therebetween. More specifically, the intervals are 90°. According to this, the action member 621 of the support member 602 is supported by the pedestal member 611 of the attachment member 601 via the plural columnar elastic bodies 631A to 631D. In addition, the support member 602 is displaced, as a result of the columnar elastic bodies 631A to 631D being warped, in the X-axis and Y-axis directions that are parallel to the attachment member 601 and in the rotational direction $R_Z$ about the Z-axis. The columnar elastic bodies 631A to 631D may have any columnar shape such as a cylindrical or prismatic shape, and, in the present exemplary embodiment, the columnar elastic bodies 631A to 631D each have a quadrangular prismatic shape. In the present exemplary embodiment, the attachment member 601, the support member 602, and the elastic member 603 are integrally formed without being structurally divided. To be noted, even in the case where an external force is applied between the attachment members 601 and 701, that is, between the attachment member 601 and the support member 602, the projection members 612A to 612D and 622A to 622D do not directly support a force to be measured. The projection members 612A to 612D may be not integrally formed with the pedestal member 611, and the projection members 622A to 622D may be not integrally formed with the action member 621. In the case where these projection members are configured as members separate from the pedestal member 611 and the action member 621, these projection members may be fixed to the pedestal member 611 and the action member 621 by using bolts, an adhesive, or the like.

The attachment member 701 includes an action member 711 and a projection member 712. The action member 711 is a rigid body having a cylindrical shape and is configured to be attached to the hand body 220 of the robot hand 202. The projection member 712 is a rigid body disposed on a side of the action member 711 opposite to the side on which the action member 711 is configured to be attached to the robot hand 202.

The support member 702 includes plural pedestal members configured to be fixed to the action member 621 of the support member 602. The plural pedestal members are four pedestal members 721A to 721D in the present exemplary embodiment. In addition, the support member 702 includes plural projection members respectively extending from the pedestal members 721A to 721D in the Z-axis direction toward the attachment member 601. The plural projection members are four projection members 722A to 722D in the present exemplary embodiment. The projection members 722A to 722D respectively project from the pedestal members 721A to 721D in the Z-axis direction so as to oppose the outer circumferential surface of the projection member 712.

The elastic member 703 is a member having elasticity and coupling the attachment member 701 with the support member 702, and is capable of being displaced in second directions, that is, a translational direction of the Z-axis direction and the rotational directions $R_X$ and $R_Y$ about the X and Y axes. Specifically, the elastic member 703 includes plural elastic units arranged in the circumferential direction C1 with intervals therebetween. The plural elastic units are four units 731A to 731D in the present exemplary embodiment.

The unit 731A includes plural plate-like elastic bodies arranged in the Z-axis direction that are two plate-like elastic bodies $732A_1$ and $732A_2$ in the present exemplary embodiment. The unit 731B includes plural plate-like elastic bodies arranged in the Z-axis direction that are two plate-like elastic bodies $732B_1$ and $732B_2$ in the present exemplary embodiment. The unit 731C includes plural plate-like elastic bodies arranged in the Z-axis direction that are two plate-like elastic bodies $732C_1$ and $732C_2$ in the present exemplary embodiment. The unit 731D includes plural plate-like elastic bodies arranged in the Z-axis direction that are two plate-like elastic bodies $732D_1$ and $732D_2$ in the present exemplary embodiment. The plate-like elastic bodies $732A_1$, $732A_2$, $732B_1$, $732B_2$, $732C_1$, $732C_2$, $732D_1$, and $732D_2$ are elastic bodies formed in plate-like shapes and are thinner than the attachment member 701 and the support member 702. The plate-like elastic bodies $732A_1$, $732A_2$, $732B_1$, $732B_2$, $732C_1$, $732C_2$, $732D_1$, and $732D_2$ are leaf springs whose normal direction on plate surfaces are the Z-axis direction.

The plate-like elastic bodies $732A_1$ and $732A_2$ of the unit 731A are formed so as to extend in the Y-axis direction, and the plate-like elastic bodies $732B_1$ and $732B_2$ of the unit 731B are formed so as to extend in the X-axis direction. In addition, the plate-like elastic bodies $732C_1$ and $732C_2$ of the unit 731C are formed so as to extend in the Y-axis direction, and the plate-like elastic bodies $732D_1$ and $732D_2$ of the unit 731D are formed so as to extend in the X-axis direction.

That is, the pairs of plate-like elastic bodies $732A_1$ and $732A_2$ to $732D_1$ and $732D_2$ are formed so as to respectively extend in radial directions toward the pedestal members 721A to 721D of the support member 702 from the action member 711 of the attachment member 701.

Although intervals between the pairs of plate-like elastic bodies $732A_1$ and $732A_2$ to $732D_1$ and $732D_2$ in the Z-axis direction may be arbitrarily set, the intervals are set to be about the thickness of the action member 711 in the Z-axis direction. To be noted, intervals between the respective pairs of plate-like elastic bodies $732A_1$ and $732A_2$, $732B_1$ and $732B_2$, $732C_1$ and $732C_2$, and $732D_1$ and $732D_2$ are set to be the same.

In the present exemplary embodiment, the plate-like elastic bodies $732A_1$ and $732A_2$ to $732D_1$ and $732D_2$ are formed by providing through holes in side surfaces of quadrangular prismatic rigid bodies extending from the action member 711 radially in the X-axis and Y-axis directions. Although the through holes are defined in rectangular parallelepiped shapes as illustrated in FIGS. 2A and 2B, the shapes of the through holes are not limited to these, and the through holes may be defined in, for example, cylindrical shapes or cubic shapes.

The support members 602 and 702 are coupled with each other via plural bolts serving as coupling portions that are the four bolts 580A to 580D in the present exemplary embodiment. Specifically, the action member 621 of the support member 602 is coupled with the pedestal members 721A to 721D of the support member 702 via the bolts 580A to 580D. Through holes are defined in the pedestal members 721A to 721D, and the pedestal members 721A to 721D are fixed to the action member 621 by the bolts 580A to 580D inserted in the through holes.

In the present exemplary embodiment, the action member 711 of the attachment member 701, the support member 702, and the elastic member 703 are integrally formed without being structurally divided. In addition, the projection member 712 of the attachment member 701 is fixed to the action member 711 via a bolt or an adhesive. Although the action member 711 and the projection member 712 are configured as separate members and are fixed to each other via a bolt or an adhesive, alternatively, these two members may be integrally formed.

As a result of the configuration described above, the attachment member 701 is relatively displaced with respect to the attachment member 601 while being bound by the elastic members 603 and 703.

Although the plate-like elastic bodies $732A_1$ and $732A_2$ to $732D_1$ and $732D_2$ of the elastic member 703 are capable of being warped in the translational direction of the Z-axis direction and in the rotational directions $R_X$ and $R_Y$ about the X and Y axes, the plate-like elastic bodies $732A_1$ and $732A_2$ to $732D_1$ and $732D_2$ are hardly warped in the translational directions of the X-axis and Y-axis directions and in the rotational direction $R_Z$ about the Z axis. Further, although the columnar elastic bodies 631A to 631D of the elastic member 603 are capable of being warped in the translational directions of the X-axis and Y-axis directions and in the rotational direction $R_Z$ about the Z axis, the columnar elastic bodies 631A to 631D are hardly warped in the translational direction of the Z-axis direction and in the rotational directions $R_X$ and $R_Y$ about the X and Y axes.

Therefore, the elastic member 603 is elastically deformed by, among forces applied between the attachment members 601 and 701, forces in the first directions, that is, the translational force Fx in the X-axis direction, the translational force Fy in the Y-axis direction, and the rotational force Mz in the rotational direction $R_Z$ about the Z axis. The elastic member 703 is elastically deformed by, among forces applied between the attachment members 601 and 701, forces in the second directions different from the first directions, that is, the translational force Fz in the Z-axis direction, the rotational force Mx in the rotational direction $R_X$ about the X axis, and the rotational force My in the rotational direction $R_Y$ about the Y axis.

According to the elastic members 603 and 703 having the configuration above, the relative displacement of the attachment member 701 with respect to the attachment member 601 occurring when an external force is applied to the attachment member 701 occurs in the same direction as the external force applied to the attachment member 701.

For example, in the case where the translational force Fz in the Z-axis direction is applied to the attachment member 701, the elastic member 703 is warped, and the elastic member 603 is hardly warped. Therefore, the attachment member 701 is displaced only in the Z-axis direction, which is the same direction as the applied force, and is hardly displaced in other directions. Similarly, in the case where the moment Mx about the X axis is applied to the attachment member 701, the elastic member 703 is warped, the elastic member 603 is hardly warped, and thus the attachment member 701 is only rotationally displaced about the X axis. In addition, in the case where the moment My about the Y axis is applied to the attachment member 701, the attachment member 701 is only rotationally displaced about the Y axis.

In contrast, in the case where the translational force Fx in the X-axis direction, the translational force Fy in the Y-axis direction, or the moment Mz about the Z axis is applied to the attachment member 701, the elastic member 703 is hardly deformed, and the structure 700 is integrally displaced with the elastic member 603 due to the deformation of the elastic member 603. As described above, the attachment member 701 is independently displaced in the direction in which an external force is applied to the attachment member 701, and thus interference with other axes is not likely to occur.

In addition, a bolt hole that is not illustrated is defined in the surface of the action member 711 of the structure 700, and the displacement measurement device 500 and the robot hand 202 are bolted to each other. Similarly, a bolt hole is defined in the surface of the pedestal member 611 of the structure 600 opposite to the surface on which the four projection members 612A to 612D are disposed, and the distal end of the robot arm 201 and the displacement measurement device 500 are mechanically coupled with each other through this bolt hole. In this way, by disposing a displacement measurement device between a hand and an arm, elastic displacement can occur in 6-axes directions of translational directions and rotational directions in the case where a force is applied to the hand.

The relative displacement of the attachment member 701 with respect to the attachment member 601 is detected by the Hall elements 801A to 801D and 802A to 802D.

The magnets 901A to 901D serving as magnetic flux generation sources are disposed at one of the attachment member 601 and the support member 602. In the present exemplary embodiment, the magnets 901A to 901D are disposed at the support member 602. Specifically, the magnets 901A to 901D are respectively fixed to the projection members 622A to 622D of the support member 602.

The Hall elements 801A to 801D serving as magneto-electric conversion elements are disposed at the other of the attachment member 601 and the support member 602. In the present exemplary embodiment, the Hall elements 801A to 801D are disposed at the attachment member 601. Specifically, the Hall elements 801A to 801D are each mounted on a circuit board that is not illustrated, and are respectively fixed to the projection members 612A to 612D of the attachment member 601 together with the circuit board.

The Hall elements 801A to 801D are sensor elements that respectively generate electrical signals indicating physical values corresponding to the relative positions or displacement thereof with respect to the magnets 901A to 901D. Specifically, the Hall elements 801A to 801D respectively detect magnetic flux densities corresponding to the relative positions thereof with respect to the magnets 901A to 901D. Thus, the sensors 951A to 951D generate electrical signals corresponding to displacement in the first directions occurring between the attachment members 601 and 701.

To be noted, the positional relationship between the magnets 901A to 901D and the Hall elements 801A to 801D may be reversed. In this case, the magnets 901A to 901D are disposed at the attachment member 601, and the Hall elements 801A to 801D are disposed at the support member 602.

The magnets 902A to 902D serving as magnetic flux generation sources are disposed at one of the attachment member 701 and the support member 702. In the present exemplary embodiment, the magnets 902A to 902D are disposed at the attachment member 701. Specifically, the magnets 902A to 902D are fixed to the outer circumferential surface of the projection member 712 of the attachment member 701.

The Hall elements 802A to 802D serving as magneto-electric conversion elements are disposed at the other of the attachment member 701 and the support member 702. In the present exemplary embodiment, the Hall elements 802A to 802D are disposed at the support member 702. Specifically, the Hall elements 802A to 802D each are mounted on a circuit board that is not illustrated, and are respectively fixed to the projection members 722A to 722D of the support member 702 together with the circuit board. That is, the magnets 902A to 902D are disposed at such positions on the projection member 712 of the attachment member 701 as to respectively oppose the Hall elements 802A to 802D.

The Hall elements 802A to 802D are sensor elements that respectively generate electrical signals indicating physical values corresponding to the relative positions or displacement thereof with respect to the magnets 902A to 902D. Specifically, the Hall elements 802A to 802D respectively detect magnetic flux densities corresponding to the relative positions thereof with respect to the magnets 902A to 902D. Thus, the sensors 952A to 952D generate electrical signals corresponding to displacement in the second directions occurring between the attachment members 601 and 701.

To be noted, the positional relationship between the magnets 902A to 902D and the Hall elements 802A to 802D may be reversed. In this case, the magnets 902A to 902D are disposed at the support member 702, and the Hall elements 802A to 802D are disposed at the attachment member 701.

As illustrated in FIG. 4, the control circuit 550 is a computer, for example, a micro-computer, including a central processing unit: CPU 551, a read-only memory: ROM 552, a random access memory: RAM 553, and an interface 554. The configuration of the control circuit 550 is not limited to this, and may be constituted by, for example, a dedicated integrated circuit: IC such as an application specific integrated circuit: ASIC or a field-programmable gate array: FPGA.

The CPU 551 obtain forces in accordance with a program stored in the ROM 552 and on the basis of electrical signals obtained from the Hall elements 801A to 801D and 802A to 802D. The RAM 553 temporarily stores various data such as results of computational processing by the CPU 551. The interface 554 converts the electrical signals from the Hall elements 801A to 801D and 802A to 802D into digital signals that can be processed by the CPU 551.

The control circuit 550, that is, the CPU 551, obtains the forces Fx and Fy in the X-axis and Y-axis directions and the moment Mz in the rotational direction $R_Z$ about the Z axis on the basis of the electrical signals from the Hall elements 801A to 801D. In addition, the control circuit 550, that is, the CPU 551, obtains the force Fz in the Z-axis direction and the moments Mx and My in the rotational directions $R_X$ and $R_Y$ about the X and Y axes on the basis of the electrical signals from the Hall elements 802A to 802D.

In the present exemplary embodiment, forces may be independently detected in each of the structures 600 and 700. First, detection of forces by using the structure 700 will be described in detail.

The control circuit 550 obtains currents or voltages as amounts of electricity proportional to the magnetic flux densities detected by the Hall elements 802A to 802D, and obtains amounts of electrical displacement from a predetermined standard amount of electricity. The standard amount of electricity corresponds to an amount of electricity when no force is applied. Amounts of displacement of the attachment member 701 corresponding to the force Fz and the moments Mx and My are calculated from amounts of electrical displacement based on results of detection by the Hall elements 802A to 802D. The Hall elements 802A to 802D detect magnetic flux densities proportional to the position of the attachment member 701 in which interference between axes is reduced, and thus the forces of three axes that are target force and target moments can be obtained with a high precision.

Here, in the case where Sa to Sd respectively represent displacement in the Z-axis direction based on the electrical signals of the Hall elements 802A to 802D, displacement $\Delta Z$ in the Z-axis direction of the attachment member 701 can be obtained by the following formula. $\Delta Z=(Sa+Sb+Sc+Sd)/4$ The translational force Fz is calculated by multiplying the displacement $\Delta Z$ by gain Kz that is a constant corresponding to the rigidity of the structure 700 in the Z-axis direction, and this relationship is expressed by the following formula.

$$Fz=Kz\cdot\Delta Z$$

Amounts of relative rotational displacement $\Delta\theta x$ and $\Delta\theta y$ are obtained by the following formulae.

$$\Delta\theta x=(Sa-Sc)/2$$

$$\Delta\theta y=(Sb-Sd)/2$$

Accordingly, the moments Mx and My are calculated by using rigidity coefficients $K\theta x$ and $K\theta y$ in accordance with the following formulae.

$$Mx=K\theta x\cdot\Delta\theta x$$

$$My=K\theta y\cdot\Delta\theta y$$

As described above, a three-axis force sensor that detects external forces Fz, Mx, and My is constituted by the structure 700. To be noted, although a redundant system in which the number of the Hall elements 802A to 802D is larger than the number of forces/moments to be detected, that is, the degree of freedom of detection, is configured in the structure 700, the number of sensors may be determined as necessary. That is, any number can be selected as long as sensors of a number equal to or larger than the number of axes for which forces are to be detected are disposed. For example, in the case of performing three-axis displacement measurement as in the present exemplary embodiment, the minimum required number of sensors is three. With this configuration, influence of noise in sensors and influence of interference between axes that slightly occurs can be reduced, and thus more reliable and more highly precise displacement measurement can be performed. To be noted, four sensors, that is, four Hall elements, may be used as in the present exemplary embodiment, and five or more sensors may be alternatively used. Further, the method of processing signals output from sensors and the formula of conversion from displacement to force are not limited to what has been described above, and more complicated processing may be performed as necessary to improve the precision of detection.

Next, detection of forces by using the structure 600 will be described in detail. Among external forces applied to the attachment member 701, external forces Fx, Fy, and Mz are transmitted to the support member 602 of the structure 600 via the structure 700. That is, the elastic member 703, the support member 702, and the support member 602 are integrally displaced with the attachment member 701 by the external forces Fx, Fy, and Mz applied to the attachment member 701 in the directions in which the external forces Fx, Fy, and Mz are applied.

Accordingly, in the present exemplary embodiment, the magnets 901A to 901D are disposed at one of the attachment member 601 and the support member 602 so as to obtain, as displacement of the attachment member 701 with respect to the attachment member 601, displacement of the support member 602 with respect to the attachment member 601. In addition, the Hall elements 801A to 801D are disposed at the other of the attachment member 601 and the support member 602.

The control circuit 550 obtains currents or voltages as amounts of electricity proportional to magnetic flux densities detected by the Hall elements 801A to 801D, and obtains amounts of electrical displacement of the amounts of electricity from a preset standard amount of electricity. The standard amount of electricity corresponds to an amount of electricity when no force is applied. The amounts of displacement of the support member 602, that is, of the attachment member 701, corresponding to the forces Fx and Fy and the moment Mz are calculated from data of amounts of electrical displacement based on results of detection by the Hall elements 801A to 801D. The Hall elements 801A to 801D detects magnetic flux densities proportional to the position of the support member 602, that is, of the attachment member 701, in which interference between axes is reduced, and thus the forces of three axes that are target forces and a target moment can be obtained with a high precision.

As described above, a three-axis force sensor that detects external forces Fx, Fy, and Mz is constituted by the structure 600. To be noted, although a redundant system in which the number of the Hall elements 801A to 801D is larger than the number of forces/moments to be detected, that is, the degree of freedom of detection, is configured in the structure 600, the number of sensors may be determined as necessary. That is, any number can be selected as long as sensors of a number equal to or larger than the number of axes for which forces are to be detected are disposed. For example, in the case of performing three-axis displacement measurement as in the present exemplary embodiment, the minimum required number of sensors is three. With this configuration, influence of noise in sensors and influence of interference between axes that slightly occurs can be reduced, and thus more reliable and more highly precise displacement measurement can be performed. To be noted, four sensors, that is, four Hall elements, may be used as in the present exemplary embodiment, and five or more sensors may be alternatively used. Further, the method of processing signals output from sensors and the formula of conversion from displacement to force are not limited to what has been described above, and more complicated processing may be performed as necessary to improve the precision of detection.

As described above, the structures 600 and 700 each have a function as a three-axis force sensor, and a six-axis force sensor is constituted by coupling the structures 600 and 700 with each other. In the present exemplary embodiment, the structure 600 can be regarded as a three-axis force sensor that detects the translational force Fz and the moments Mx and My, and the structure 700 can be regarded as a three-axis force sensor that detects the translational forces Fx and Fy and the moment Mz. The displacement measurement device 500 configured as a six-axis sensor in this way has a configuration in which sensors are disposed in each of the structures 600 and 700 to detect displacement between an action member and a pedestal member of each of the structures 600 and 700 and detection of displacement is not performed between the two structures 600 and 700.

Figure 9A:
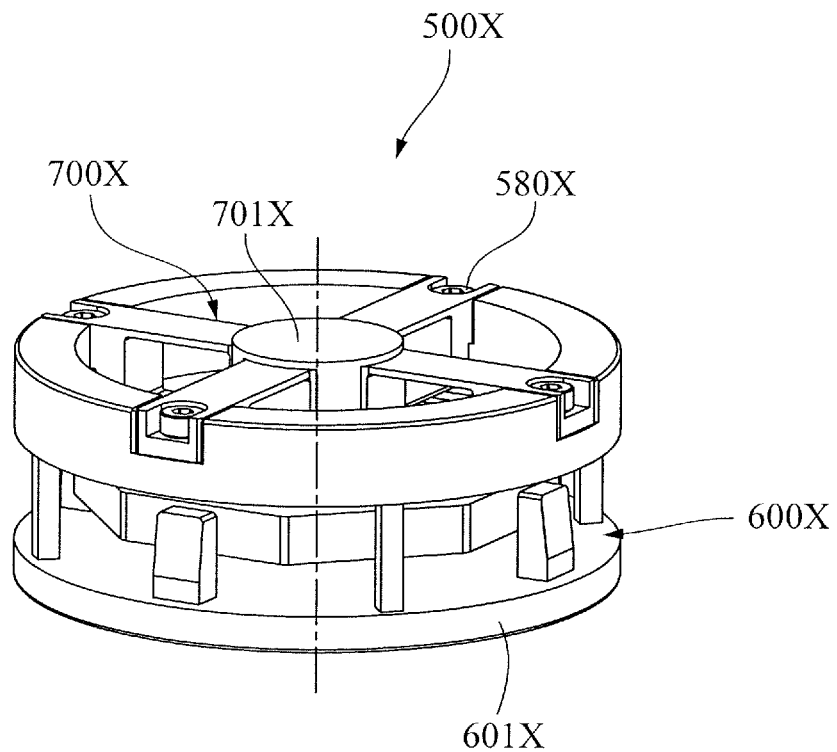
FIG. 9A is a perspective view of a displacement measurement device according to a comparative embodiment.
Figure 9B:
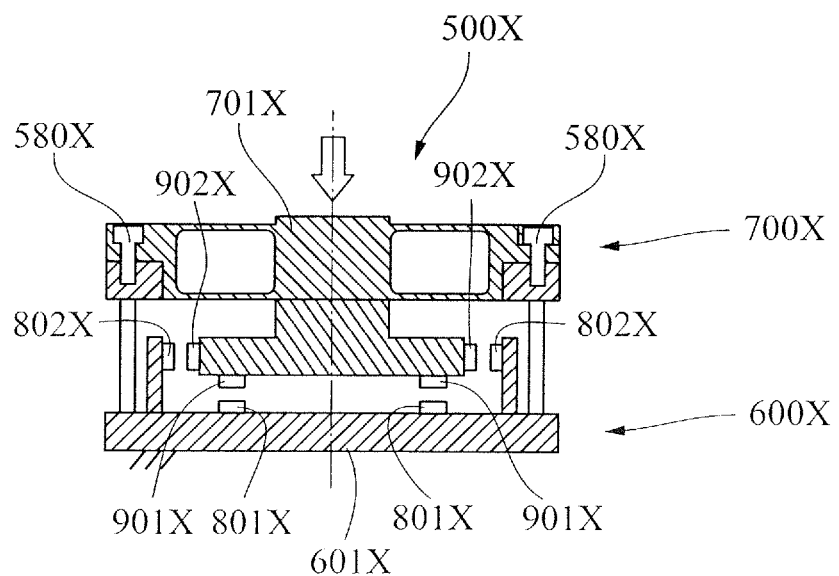
FIG. 9B is a section view of the displacement measurement device according to the comparative embodiment.

A displacement measurement device of a comparative embodiment will be described herein. FIG. 9A is a perspective view of the displacement measurement device of the comparative embodiment, and FIG. 9B is a section view of the displacement measurement device of the comparative embodiment.

A displacement measurement device 500X of the comparative embodiment includes structures 600X and 700X, and the structures 600X and 700X are fastened to each other via bolts 580X. The displacement measurement device 500X of the comparative embodiment is configured such that relative displacement between an attachment portion 601X of the structure 600X and an attachment portion 701X of the structure 700X is directly detected. Specifically, a Hall element 801X serving as a first sensor and a Hall element 802X serving as a second sensor are disposed at the attachment member 601X, and a magnet 901X serving as a first detected member and a magnet 902X serving as a second detected member are disposed at the attachment member 701X. Since the structures 600X and 700X are bolted to each other, displacement derived from sliding occurs at a bolted portion when an external force is applied between the attachment members 601X and 701X.

Figure 10A:
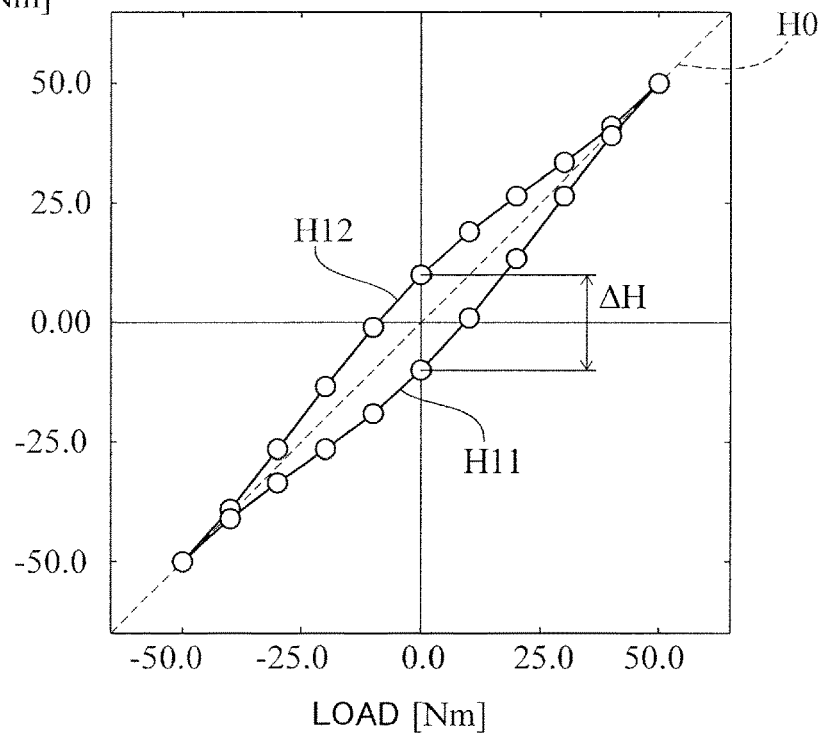
FIG. 10A is a graph illustrating measurement results of hysteresis of force detected by the displacement measurement device according to the comparative embodiment.
Figure 10B:
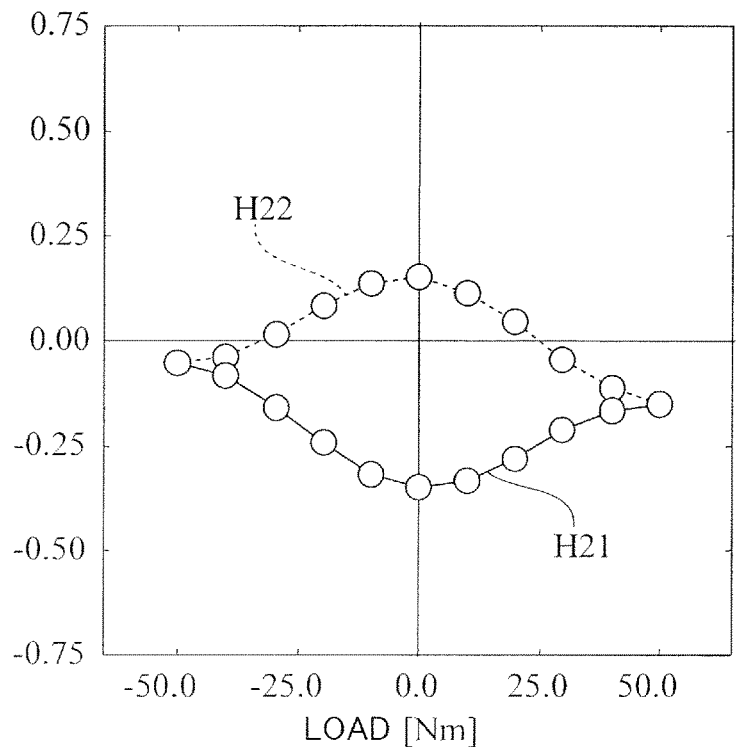
FIG. 10B is a graph illustrating measurement results of hysteresis of error of force detected by the displacement measurement device according to the comparative embodiment.

FIG. 10A is a graph illustrating results of measurement of hysteresis of force detected by the displacement measurement device 500X of the comparative embodiment, and FIG. 10B is a graph illustrating results of measurement of hysteresis of error of force detected by the displacement measurement device 500X of the comparative embodiment. FIGS. 10A and 10B illustrate the moment Mz about the Z axis.

An experiment was conducted in a state in which only the moment Mz was applied to the displacement measurement device 500X and no moment or transitional force of other axes was applied. FIG. 10A illustrates a relationship between applied moment loads and values of detected moment output from the displacement measurement device 500X in the case where the moment Mz about the Z axis is applied to the displacement measurement device 500X. FIG. 10B illustrates a relationship between applied moment loads and values of errors of detected moment output from the displacement measurement device 500X in the case where the moment Mz about the Z axis is applied to the displacement measurement device 500X. These errors are differences between the applied moment loads and the values of detected moments output from the displacement measurement device 500X. Data indicating force and output from the displacement measurement device 500X will be hereinafter referred to as sensor output data.

As illustrated in FIG. 10A, a hysteresis error ΔH occurs between sensor output data H11 obtained when the moment Mz applied to the displacement measurement device 500X is gradually increased and sensor output data H12 obtained when the moment Mz is gradually decreased. Here, ideal output values H0 to be output from the displacement measurement device 500X correspond to exact values of the applied moment Mz, and thus are indicated by a straight line in FIG. 10A. Errors of the sensor output data H11 and H12 from the ideal output values H0, that is, output errors H21 and H22 of the force sensor, are illustrated in FIG. 10B. As illustrated in FIG. 10B, there is a large hysteresis difference between the errors H21 obtained when the applied moment Mz is increased and the errors H22 obtained when the applied moment Mz is decreased. The hysteresis error is as large as about 0.5 Nm.

That is, it is difficult to produce a structure constituted by a first attachment portion, a first elastic portion, a support portion, a second elastic portion, and a second attachment portion as a single body by processing a single piece of material by, for example, cutting. Therefore, a method of producing a first structure constituted by the first attachment portion, the first elastic portion, and a first support portion and a second structure constituted by the second attachment portion, the second elastic portion, and a second support portion separately and coupling the first structure with the second structure via a coupling portion such as a bolt can be considered.

However, according to the configuration of coupling the first structure with the second structure via the coupling portion, slight displacement occurs at a coupling interface when a force is applied. For example, in the case where the first and second support portions that are intermediate members disposed so as to enable transmitting force to both of the first and second elastic members are coupled with each other via the coupling portion, slight positional deviation occurs between the first support portion and the second support portion due to the applied force.

In this case, if a sensor that detects displacement is disposed between two structures as in the comparative embodiment described above, the displacement at the coupling interface is not cancelled and the output of the sensor does not return to a correct state when the force is removed. That is, a so-called hysteresis characteristic in which values of detected force are different between when an applied force is increased and when the applied force is decreased becomes large.

Figure 5:
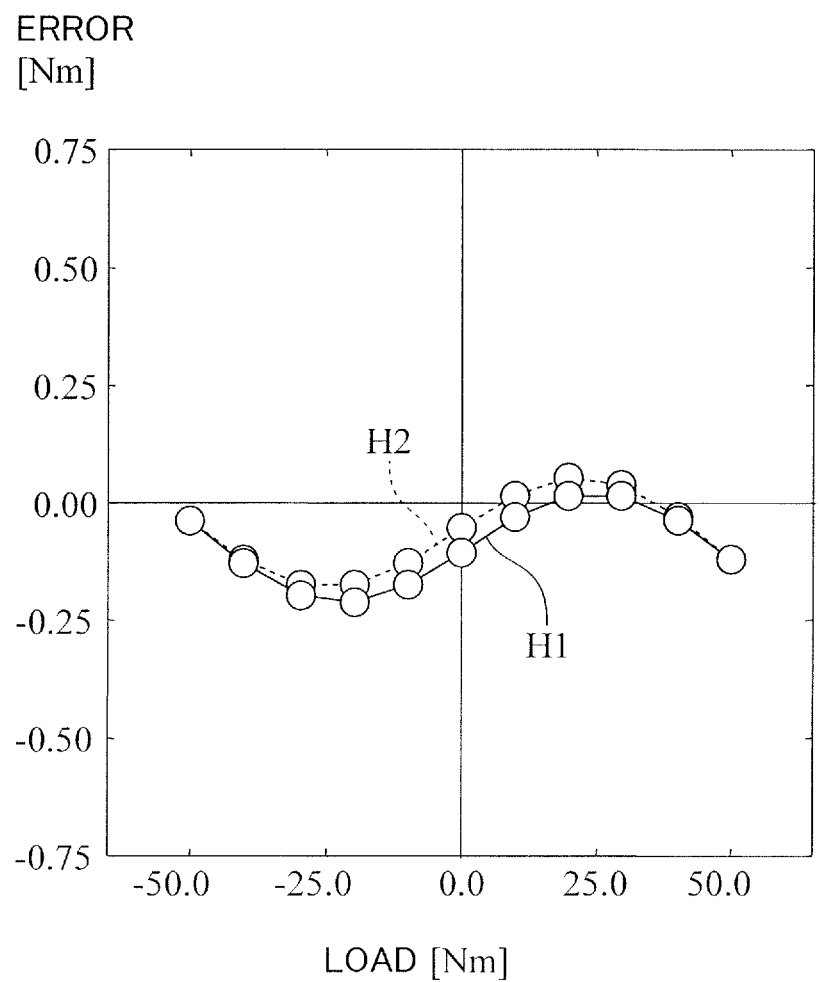
FIG. 5 is a graph illustrating measurement results of hysteresis of error of force detected by the displacement measurement device according to the first exemplary embodiment.

FIG. 5 is a graph illustrating results of measurement of hysteresis of error of force detected by the displacement measurement device 500 according to the first exemplary embodiment. FIG. 5 illustrate the moment Mz about the Z axis. Similarly to the comparative embodiment, an experiment was conducted in a state in which only the moment Mz was applied to the displacement measurement device 500, and no moment or translational force of other axes was applied.

The difference between the maximum value and the minimum value of the errors H1 from the ideal values of sensor output data obtained in the case where the moment Mz applied to the displacement measurement device 500 was gradually increased was about 0.25 Nm. In addition, the difference between the maximum value and the minimum value of the errors H2 from the ideal values of sensor output data obtained in the case where the moment Mz applied to the displacement measurement device 500 was gradually decreased was about 0.25 Nm. Therefore, it can be recognized that the precision of displacement measurement is improved such that the error is about a half of the comparative embodiment. In particular, differences between the errors H1 and the errors H2 are remarkably small compared with the comparative embodiment, and it can be recognized that the hysteresis is smaller.

As described above, even in the case where sliding, that is, positional deviation, occurs between the support members 602 and 702 fastened to each other via the bolts 580A to 580D, the positional deviation can be prevented from influencing the results of detection of the Hall elements 801A to 801D and 802A to 802D. Therefore, detection of force can be performed with a high precision. That is, positional deviation at a coupling interface can be prevented from influencing results of detection by a first sensor and a second sensor in a configuration in which a first structure is coupled with a second structure via a coupling portion, and thus highly precise displacement measurement in which hysteresis is reduced can be performed.

Specifically, portions to which force to be detected is applied can be integrally formed in the structures 600 and 700, and the structures 600 and 700 can be configured not to include a friction fastening portion that causes sliding when force is applied. Therefore, relative positions of the attachment member 701 and the support member 702 and relative positions of the support member 602 and the attachment member 601 do not drift due to sliding at the fastening portion even when external force applied between the attachment members 601 and 701 is removed. Accordingly, the relative positions of the attachment member 701 and the support member 702 and the relative positions of the support member 602 and the attachment member 601 can be accurately returned to initial positions, and forces obtained on the basis of displacement of these members can be accurately returned to zero. That is, hysteresis occurring in results of detection by the Hall elements 801A to 801D and 802A to 802D can be reduced regardless of history of application of external force. Therefore, detection of force can be performed with a high precision. As described above, in a configuration in which the support members 602 and 702 are bolted to each other, positional deviation at the fastening portion can be prevented from influencing results of detection by the Hall elements 801A to 801D and 802A to 802D, and thus highly precise displacement measurement in which hysteresis is reduced can be performed.

In addition, since the displacement measurement device 500 can be configured to include separate structures 600 and 700, each of the structures 600 and 700 can be manufactured with a high precision. Further, by combining the structures 600 and 700 with each other, the displacement measurement device 500 can be assembled easily. Therefore, the structures 600 and 700 can be disposed in a nested state, that is, so as to overlap each other, and thus the structures 600 and 700 can be disposed densely. That is, a spaciously efficient compact displacement measurement device 500 can be easily manufactured while highly precise detection is possible.

To be noted, although a case where the attachment member 601 is attached to the robot arm 201 serving as a first member and the attachment member 701 is attached to the robot hand 202 serving as a second member has been described, the configuration is not limited to this. That is, a configuration in which the attachment member 601 is attached to the robot hand 202 and the attachment member 701 is attached to the robot arm 201 may be also employed.

Second Exemplary Embodiment

Figure 6A:
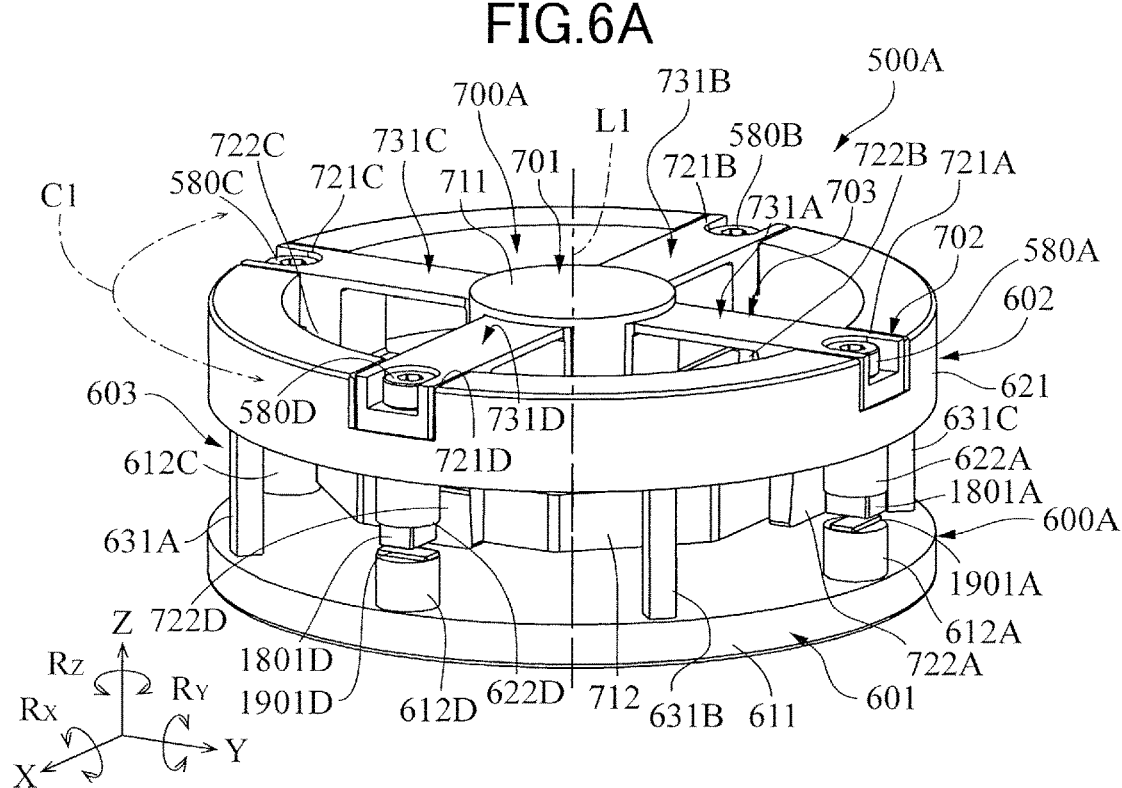
FIG. 6A is a perspective view of a displacement measurement device according to a second exemplary embodiment.
Figure 6B:
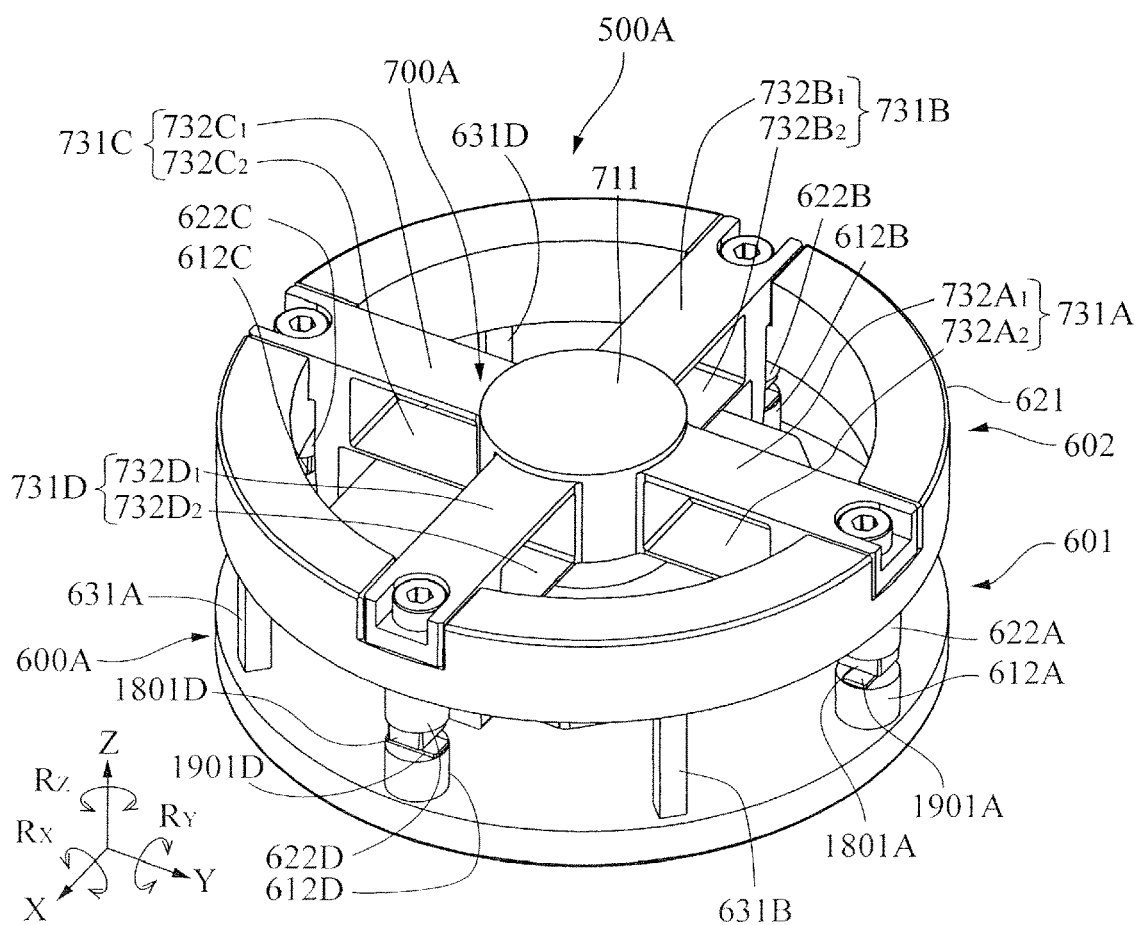
FIG. 6B is a perspective view of the displacement measurement device from an angle different from FIG. 6A.
Figure 7:
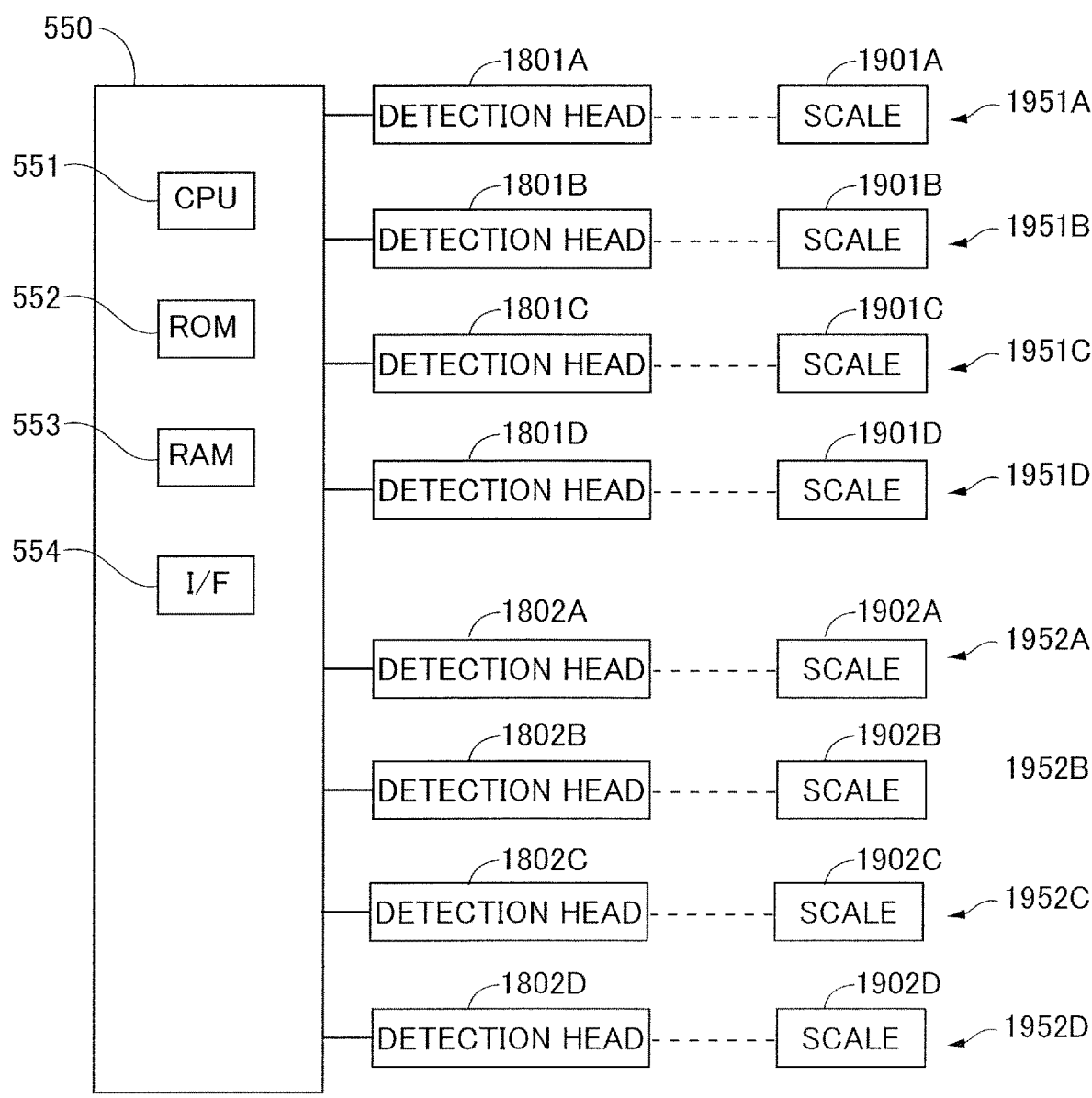
FIG. 7 is a block diagram illustrating a configuration of a detection system of the displacement measurement device according to the second exemplary embodiment.

Next, a displacement measurement device according to a second exemplary embodiment of the present invention will be described. FIGS. 6A and 6B are perspective views of the displacement measurement device according to the second exemplary embodiment. To be noted, FIG. 6B is a perspective view of the displacement measurement device in a direction different from FIG. 6A. FIG. 7 is a block diagram illustrating a configuration of a detection system of the displacement measurement device according to the second exemplary embodiment. Components similar to the displacement measurement device 500 of the first exemplary embodiment in a displacement measurement device 500A of the second exemplary embodiment are denoted by the same reference signs as the first exemplary embodiment and descriptions thereof will be omitted. The displacement measurement device 500A includes a structure 600A serving as a first structure and a structure 700A serving as a second structure. The structure 600A includes the attachment member 601, the support member 602, and the elastic member 603 similarly to the first exemplary embodiment. The structure 700A includes the attachment member 701, the support member 702, and the elastic member 703 similarly to the first exemplary embodiment.

In the first exemplary embodiment, a case where Hall elements are used as first and second detecting members and magnets are used as first and second detected members has been described. In the second exemplary embodiment, a case where a linear encoder is constituted by a detecting member and a detected member will be described. To be noted, the linear encoder may be any encoder such as an optical encoder or an electromagnetic induction encoder, and an optical encoder is preferred.

In the second exemplary embodiment, linear encoders 1951A to 1951D serve as first sensors, and linear encoders 1952A to 1952D serve as second encoders. Scales 1901A to 1901D of the linear encoders 1951A to 1951D serve as first detected members, and detection heads 1801A to 1801D of the linear encoders 1951A to 1951D serve as first detecting members. In addition, scales 1902A to 1902D of the linear encoders 1952A to 1952D serve as second detected members, and detection heads 1802A to 1802D of the linear encoders 1952A to 1952D serve as second detecting members.

The detection heads 1801A to 1801D are sensor elements that generate electrical signals indicating physical values corresponding to relative positions or displacement with respect to the scales 1901A to 1901D. The detection heads 1802A to 1802D are sensor elements that generate electrical signals indicating physical values corresponding to relative positions or displacement with respect to the scales 1902A to 1902D.

Here, in the case where the linear encoders are incremental linear encoders, the detection heads 1801A to 1801D and 1802A to 1802D count the number of pulses as physical values indicating displacement of the scales 1901A to 1901D and 1902A to 1902D. That is, the detection heads 1801A to 1801D and 1802A to 1802D obtain, by counting pulses corresponding to patterns of the scales 1901A to 1901D and 1902A to 1902D, amounts of displacement of the scales 1901A to 1901D and 1902A to 1902D corresponding to elastic deformation from a state in which the elastic members 603 and 703 are not elastically deformed.

In the case where the linear encoders are absolute linear encoders, the detection heads 1801A to 1801D and 1802A to 1802D obtain the positions of the scales 1901A to 1901D and 1902A to 1902D as digital values. In this case, the control circuit 550, that is, the CPU 551, may obtain the amounts of displacement from differences between detected values and a preset standard value.

As described above, in the case where the linear encoders are incremental linear encoders, digital signal processing in which displacement is counted as pulses can be used, and thus a displacement measurement device that has a high rigidity, a high resolution, and a high load characteristic at the same time and has a wide dynamic range can be realized. In addition, also in the case where the linear encoders are absolute linear encoders, obtained positions can be processed via digital signal processing, and thus a displacement measurement device that has a high rigidity, a high resolution, and a high load characteristic at the same time and has a wide dynamic range can be realized.

Third Exemplary Embodiment

Figure 8:
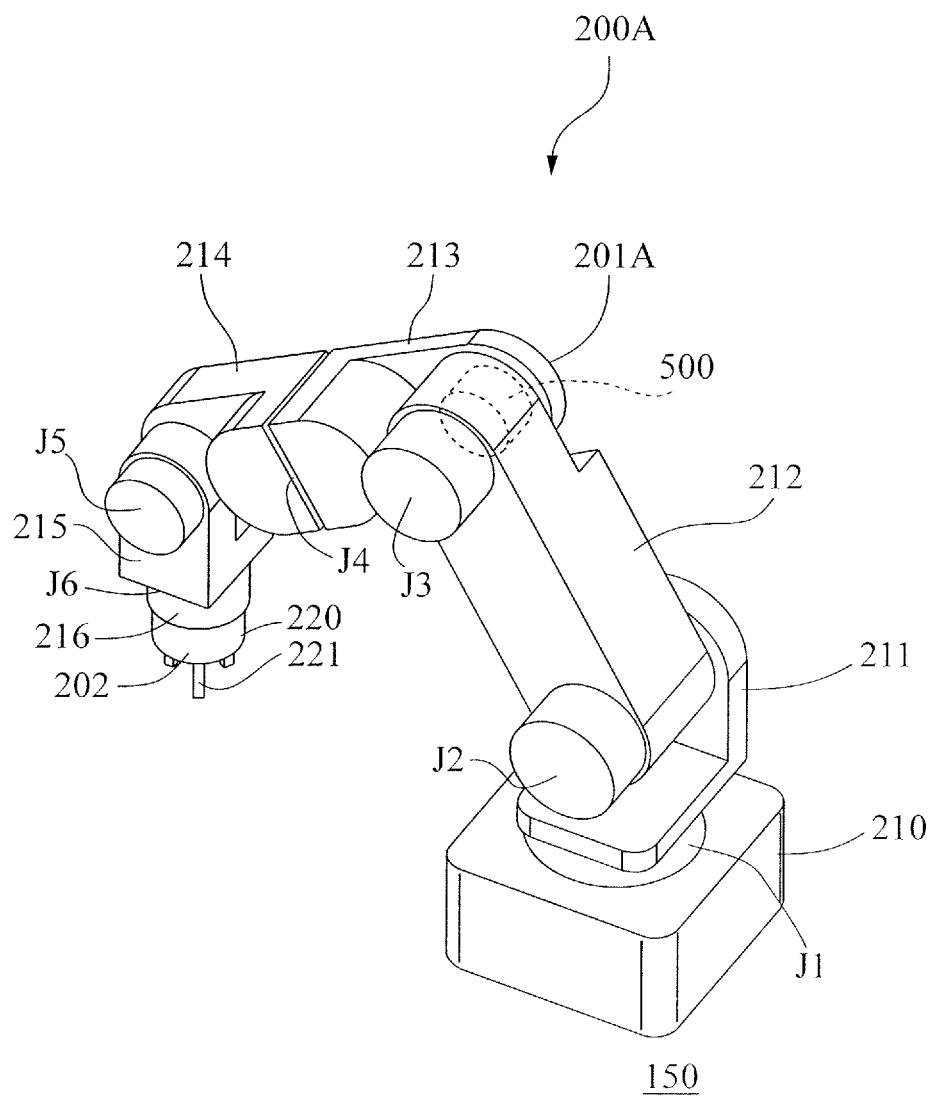
FIG. 8 is a perspective view of a robot according to a third exemplary embodiment.

Next, a robot according to a third exemplary embodiment of the present invention will be described. FIG. 8 is a perspective view of a robot according to the third exemplary embodiment. In the third exemplary embodiment, components similar to the first exemplary embodiments are denoted by the same reference signs and descriptions thereof will be omitted. Although a case where a displacement measurement device is disposed at a wrist part of a robot has been described in the first exemplary embodiment, the placement of the displacement measurement device is not limited to this. In the third exemplary embodiment, a case where a displacement measurement device is disposed at a joint of a robot arm will be described. A robot 200A of the third exemplary embodiment includes a robot arm 201A and the robot hand 202 serving as an end effecter. The robot arm 201A includes the plural links 210 to 216 coupled with one another via the joints J1 to J6. In the third exemplary embodiment, the displacement measurement device 500 is disposed between the link 212 serving as a first link and the link 213 serving as a second link coupled with the link 212 to be rotatable with respect to the link 212. The displacement measurement device 500 is bolted to the link 213 through a bolt hole defined in the surface of the action member 711 of the structure 700 of the displacement measurement device 500, and the pedestal member 611 of the structure 600 is coupled with an output end of the joint J3 via, for example, a bolt.

That is, in the third exemplary embodiment, one of the first member and the second member is the link 212 and the other is the link 213. According to this configuration, the displacement measurement device 500 can measure forces and moments of six axes applied to the joint J3. Generally, in the case where a force sensor, or a displacement measurement device in this case, is attached to a distal end of a robot arm, there is a problem that the size, or length, and weight of the wrist part increase and the overall mobility, or acceleration property, and conveyance property of the robot decreases. However, by disposing the displacement measurement device as a part of the structure of the robot arm, force applied to the hand can be measured while suppressing increase of the size and weight of the distal end of the robot. In addition, according to this configuration, not only external force applied to the hand but also external force applied to links on the distal end side of the joint J3 can be detected.

Although a case where the displacement measurement device 500 is disposed at the joint J3 has been described in the third exemplary embodiment, the position of the displacement measurement device 500 is not limited to the joint J3 as long as the displacement measurement device 500 is disposed at least one of the joints J1 to J6. That is, the displacement measurement device 500 may be disposed at part of or all of the plural joints J1 to J6.

The present invention is not limited to the exemplary embodiments described above, and may be modified in various ways within the technical concept of the present invention. In addition, the advantageous effects described in the exemplary embodiments are just enumeration of the most preferable effects achieved by the present invention, and the effects of the present invention are not limited to ones described in the exemplary embodiments.

Although displacement measurement devices of a magnetic type and a linear encoder type have been described in the exemplary embodiments, the type of the displacement measurement device is not limited to these, and, for example, a displacement measurement device of a capacitance type may be used. That is, a displacement measurement device in which an electrode is disposed as a detected member and capacitance is detected as a physical value that changes in accordance with a positional relationship between the electrode and a sensor element.

In addition, although a configuration in which the first structure detects the translational forces Fx and Fy and the moment Mz and the second structure detects the translational force Fz and the moments Mx and My has been described in the present exemplary embodiments, the configuration is not limited to this. For example, a configuration in which the first structure detects the translational forces Fx, Fy, and Fz and the second structure detects the moments Mx, My, and Mz may be employed. In addition, axes for displacement measurement do not need to be separated between structures, and a configuration in which axes for displacement measurement are set in such a redundant manner as the first structure detects the forces Fx, Fy, and Fz and the second structure detects the force Fz and the moments Mx, My, and Mz.

In addition, although a configuration in which the displacement measurement device detects forces of all six axes has been described, the configuration is not limited to this. For example, the present invention is also applicable to a case of configuring a displacement measurement device that detects forces of two or more and five or less axes.

In addition, the shape of the elastic member is not limited to the shape described above, and the elastic member may be formed in any shape in accordance with the purpose of the displacement measurement.

In addition, the position of the displacement measurement device is not limited to a position between a robot arm and an end effecter or to a joint of the robot arm, and may be another position. For example, the position of the displacement measurement device may be the proximal end of the robot arm. In addition, the displacement measurement device may be applied to devices other than robots.

In addition, although cases where a sensor is constituted by a magnetic field generation source and a magnetoelectric conversion element and where a sensor is constituted by a scale and a detection head have been described in the exemplary embodiments described above, the configuration of the sensor is not limited to these as long as an electrical signal corresponding to displacement is generated. An optical sensor element and a capacitance sensor element may be also used as a detecting member of the sensor.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-198590, filed Oct. 7, 2016, which is hereby incorporated by reference wherein in its entirety.

What is claimed is:

1. A displacement measurement device configured to obtain amounts of displacement between a first member and a second member in at least one first direction and in at least one second direction different from the at least one first direction, the displacement measurement device comprising:
    a first structure comprising a first attachment portion configured to be attached to the first member;
    a second structure comprising a second attachment portion configured to be attached to the second member; and
    a coupling portion configured to couple the first structure with the second structure,
    wherein the first structure comprises a first sensor configured to generate an electrical signal corresponding to displacement between the first attachment portion and the second attachment portion in the at least one first direction, and
    wherein the second structure comprises a second sensor configured to generate an electrical signal corresponding to displacement between the first attachment portion and the second attachment portion in the at least one second direction.

2. The displacement measurement device according to claim 1,
    wherein the first structure comprises:
    a first support portion; and
    a first elastic portion configured to couple the first attachment portion with the first support portion and capable of being displaced in the at least one first direction,
    wherein the first sensor is configured to generate an electrical signal corresponding to displacement between the first attachment portion and the first support portion,
    wherein the second structure comprises:
    a second support portion; and
    a second elastic portion configured to couple the second attachment portion with the second support portion and capable of being displaced in the at least one second direction, and
    wherein the second sensor is configured to generate an electrical signal corresponding to displacement between the second attachment portion and the second support portion.

3. The displacement measurement device according to claim 2,
    wherein the first sensor comprises:
    a first detecting member disposed at one of the first attachment portion and the first support portion; and
    a first detected member disposed at another of the first attachment portion and the first support portion, and
    wherein the second sensor comprises:
    a second detecting member disposed at one of the second attachment portion and the second support portion; and
    a second detected member disposed at another of the second attachment portion and the second support portion.

4. The displacement measurement device according to claim 3,
    wherein the first elastic portion is formed from a same peace of a material as the first attachment portion and the first support portion and coupled with the first attachment portion and the first support portion, and
    wherein the second elastic portion is formed from a same peace of a material as the second attachment portion and the second support portion and coupled with the second attachment portion and the second support portion.

5. The displacement measurement device according to claim 3, wherein the first detected member is a magnetic flux generation source and the first detecting member is a magnetoelectric conversion element.

6. The displacement measurement device according to claim 3, wherein the first detected member is a scale of a linear encoder and the first detecting member is a detection head of the linear encoder.

7. The displacement measurement device according to claim 3, wherein the second detected member comprises a magnetic flux generation source and the second detecting member comprises a magnetoelectric conversion element.

8. The displacement measurement device according to claim 3, wherein the second detected member is a scale of a linear encoder and the second detecting member is a detection head of the linear encoder.

9. The displacement measurement device according to claim 2,
    wherein the first elastic portion comprises plural columnar elastic bodies arranged in a circumferential direction about a straight line with intervals therebetween and extending along the straight line, the straight line extending from the first attachment portion to the second attachment portion,
    wherein the second elastic portion comprises plural units arranged in the circumferential direction with intervals therebetween, and
    wherein the plural units each comprise plural plate-like elastic bodies arranged in the direction of the straight line and extending in a direction perpendicular to the straight line.

10. The displacement measurement device according to claim 1 comprising a controller configured to obtain a force in the at least one first direction on a basis of the electrical signal obtained from the first sensor and obtain a force in the at least one second direction on a basis of the electrical signal obtained from the second sensor.

11. The displacement measurement device according to claim 1,
    wherein the at least one first direction comprises a translational direction along a line perpendicular to a straight line extending from the first attachment portion to the second attachment portion and a rotational direction about the straight line extending from the first attachment portion to the second attachment portion, and
    wherein the at least one second direction comprises a translational direction along the straight line extending from the first attachment portion to the second attachment portion and a rotational direction about the line perpendicular to the straight line extending from the first attachment portion to the second attachment portion.

12. The displacement measurement device according to claim 1, wherein the coupling portion is a bolt.

13. A displacement measurement device comprising:
a first attachment portion configured to be attached to a first member;
a second attachment portion configured to be attached to a second member;
an intermediate member disposed between the first attachment portion and the second attachment portion;
a first elastic member configured to couple the first attachment portion with the intermediate member and capable of being displaced in at least one first direction;
a second elastic member configured to couple the second attachment portion with the intermediate member and capable of being displaced in at least one second direction different from the at least one first direction;
a first sensor configured to detect displacement between the first attachment portion and the intermediate member in the at least one first direction; and
a second sensor configured to detect displacement between the second attachment portion and the intermediate member in the at least one second direction.

14. A robot comprising:
a robot arm;
an end effecter;
a first structure comprising a first attachment portion configured to be attached to the robot arm;
a second structure comprising a second attachment portion configured to be attached to the end effecter; and
a coupling portion configured to couple the first structure with the second structure,
wherein the first structure comprises a first sensor configured to generate an electrical signal corresponding to displacement between the first attachment portion and the second attachment portion in at least one first direction, and
wherein the second structure comprises a second sensor configured to generate an electrical signal corresponding to displacement between the first attachment portion and the second attachment portion in at least one second direction different from the at least one first direction.

15. The robot according to claim 14,
wherein the first structure comprises:
a first support portion; and
a first elastic portion configured to couple the first attachment portion with the first support portion and capable of being displaced in the at least one first direction,
wherein the first sensor is configured to generate an electrical signal corresponding to displacement between the first attachment portion and the first support portion,
wherein the second structure comprises:
a second support portion; and
a second elastic portion configured to couple the second attachment portion with the second support portion and capable of being displaced in the at least one second direction, and
wherein the second sensor is configured to generate an electrical signal corresponding to displacement between the second attachment portion and the second support portion.

16. A robot arm comprising:
a first link;
a second link coupled with the first link to be rotatable with respect to the first link;
a first structure comprising a first attachment portion configured to be attached to the first link;
a second structure comprising a second attachment portion configured to be attached to the second link; and
a coupling portion configured to couple the first structure with the second structure,
wherein the first structure comprises a first sensor configured to generate an electrical signal corresponding to displacement between the first attachment portion and the second attachment portion in at least one first direction, and
wherein the second structure comprises a second sensor configured to generate an electrical signal corresponding to displacement between the first attachment portion and the second attachment portion in at least one second direction different from the at least one first direction.

17. The robot arm according to claim 16,
wherein the first structure comprises:
a first support portion; and
a first elastic portion configured to couple the first attachment portion with the first support portion and capable of being displaced in the at least one first direction,
wherein the first sensor is configured to generate an electrical signal corresponding to displacement between the first attachment portion and the first support portion,
wherein the second structure comprises:
a second support portion; and
a second elastic portion configured to couple the second attachment portion with the second support portion and capable of being displaced in the at least one second direction, and
wherein the second sensor is configured to generate an electrical signal corresponding to displacement between the second attachment portion and the second support portion.

* * * * *